United States Patent [19]

Herzl

[11] 4,391,149

[45] Jul. 5, 1983

[54] DOPPLER-TYPE ULTRASONIC FLOWMETER

[75] Inventor: Peter J. Herzl, Morrisville, Pa.

[73] Assignee: Fischer & Porter Company, Warminster, Pa.

[21] Appl. No.: 263,473

[22] Filed: May 15, 1981

[51] Int. Cl.³ .............................................. G01F 1/66
[52] U.S. Cl. ............................. 73/861.25; 73/861.04
[58] Field of Search .......... 73/861.25, 432 PS, 861.04; 128/663

[56] References Cited

U.S. PATENT DOCUMENTS

| | | | |
|---|---|---|---|
| 3,208,286 | 9/1965 | Richard | 73/432 PS |
| 3,675,192 | 7/1972 | Fahrbach | 73/861.25 |
| 3,741,014 | 6/1973 | Tamura | 73/861.25 |
| 3,901,077 | 8/1975 | McCarty et al. | 73/861.25 |

Primary Examiner—Charles A. Ruehl
Attorney, Agent, or Firm—Michael Ebert

[57] ABSTRACT

A Doppler-type ultrasonic flowmeter whose transmitting transducer is excited by an oscillator to project into the meter pipe a diverging beam of ultrasonic energy. The projected beam is reflected by contaminants carried by the fluid lying within the zone in which the projected beam intersects a reception beam converging toward a receiving transducer which picks up the reflected energy. The transmitted signal is mixed with the Doppler signal yielded by the receiving transducer to yield positive and negative beats which are applied to a low-pass filter from which is extracted a band of negative beat frequencies representing the disparate flow velocities of the contaminants within the zone dictated by the prevailing velocity profile of the fluid. This band is subjected to spectral analysis to determine the velocities of the contaminants and their relative percentages, from which the flow profile of the fluid being metered is calculated to ascertain the mean flow velocity thereof.

7 Claims, 7 Drawing Figures

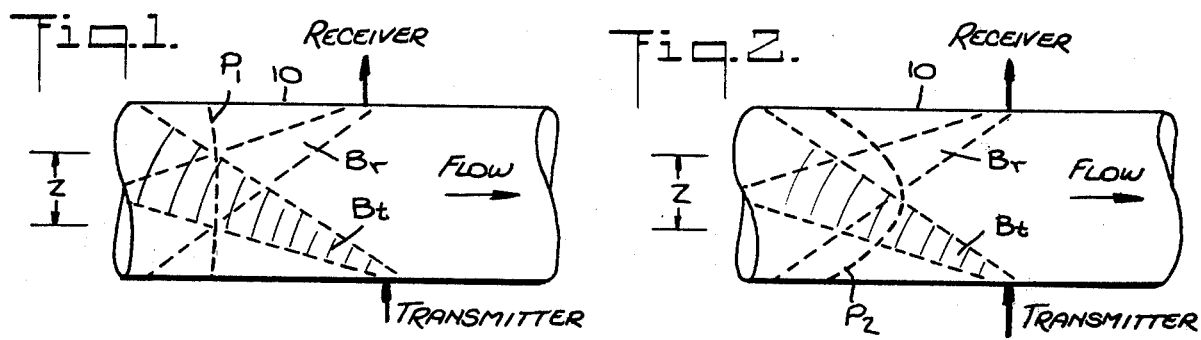
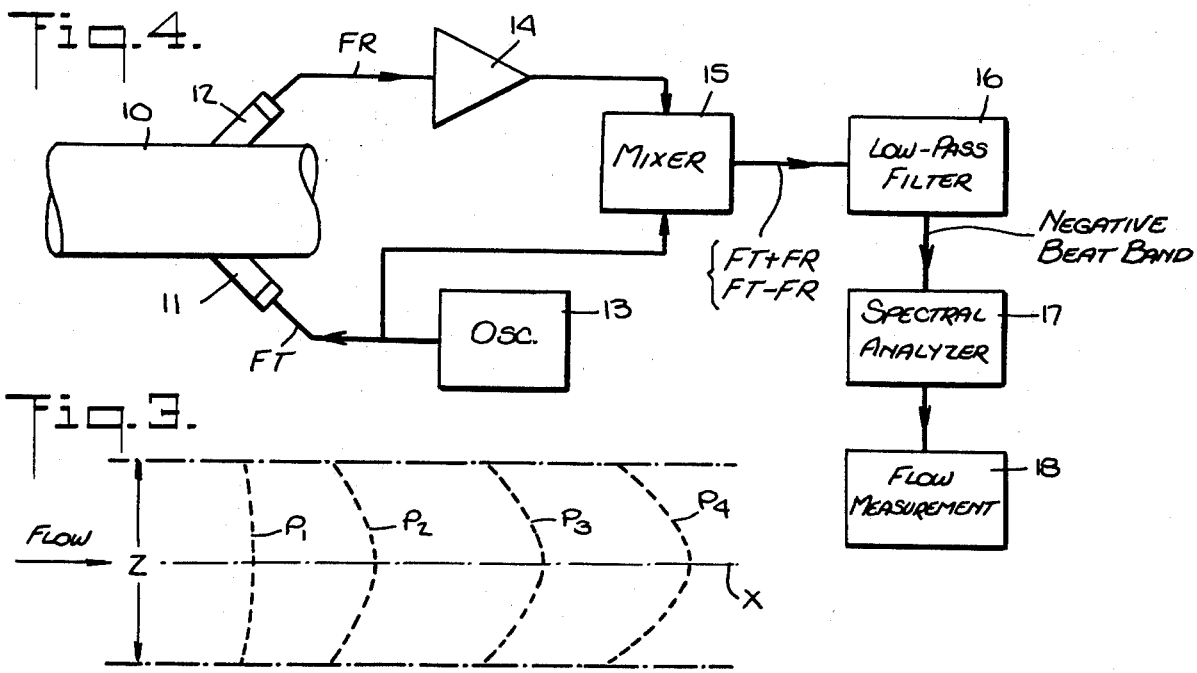
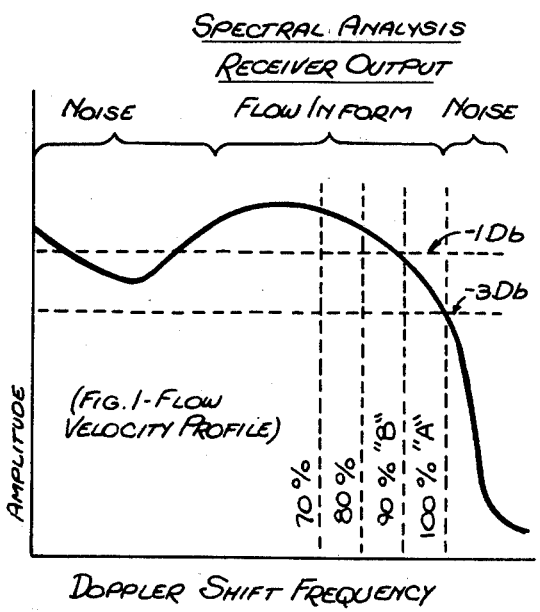
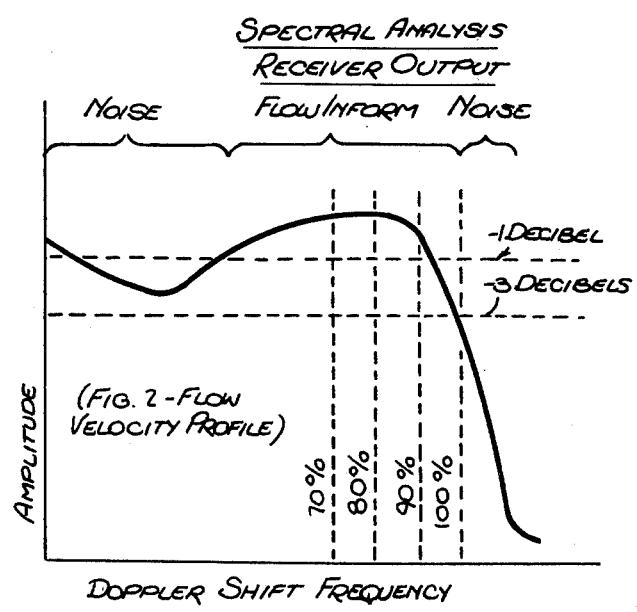

DOPPLER-TYPE ULTRASONIC FLOWMETER

BACKGROUND OF INVENTION

This invention relates generally to ultrasonic flowmeters for measuring flow rate, and in particular to a Doppler-type meter which is corrected for errors arising from changes in the flow velocity profile of the fluid being metered to provide more accurate readings than standard meters of the same type.

In general, ultrasonic flowmeters are either of the through-beam or of the Doppler-type. In a through-beam meter, the meter pipe has upstream and downstream transducers mounted thereon which are alternately excited to generate an ultrasonic pulse which is propagated through the fluid being metered and received by the other transducer. The upstream propagation time minus the downstream propagation time represents the time delay difference between the generation of the emitted pulses and their reception. This difference is a function of the flow velocity of the fluid and is convertible into a flow rate reading.

The through-beam ultrasonic flowmeter is acceptably accurate only when the liquid being metered is substantially free of contaminants; for the presence of particulate matter in the propagation path causes this meter to malfunction. In contradistinction, contaminants in the fluid are essential to the operation of a Doppler-type meter.

The Doppler effect is encountered whenever a wave source generating sonic, radio-frequency, light or any other form of wave activity and a wave receiver are in relative motion with respect to one another. When the distance between the source and its receiver is decreasing, extra waves are detected in a given time, resulting in an apparent increase in the received frequency. When, however, the distance is increasing, an apparent decrease is experienced in the frequency of the received signal.

Thus in a continuous wave Doppler-type radar system, the projected radar wave is reflected by a moving target and picked up by a radar receiver, so that the distance travelled by the radar wave between the transmitter and receiver varies as a function of target movement, the resultant difference between the transmitted and received frequencies being proportional thereto. Similarly, in a Doppler-type ultrasonic flowmeter, a shift in received frequency results from the reflection of a projected beam of ultrasonic energy by bubbles, particles or other contaminants carried by the fluid being metered.

In a Doppler-type ultrasonic flowmeter, the transmitted signal is mixed with the received signal to produce a beat signal which represents the difference therebetween, the frequency of the beat signal being proportional to the velocity of the reflecting contaminants and hence to the flow rate of the fluid through the flow pipe.

Because in a Doppler-type ultrasonic flowmeter the transmitting and receiving transducers are mounted on the exterior of the meter pipe, the instrument is obstructionless and is free of erosion and corrosion problems. The normal fields of application for a Doppler-type flowmeter are pipes conducting contaminated media where through-beam flowmeters do not work or perform poorly. Thus Doppler-type ultrasonic flowmeters are useful in metering raw sewage or sludge in water treatment plants as well as in metering wash or wastewater, slurries and effluents in chemical, paper processing and mining systems.

As noted in the article by Morris in the August 1979 issue of *Control Engineering*, entitled "What's Available in Ultrasonic Flowmeters,"0 the accuracy of Doppler-type flowmeters is normally less than that quoted for through-beam meters. Thus, among the through-beam strap-on type commercial meters identified by Morris is an instrument produced by Controlotron Corporation, whose specifications indicate an accuracy of ±0.5 to ±1.5%. Also identified by Morris among the strap-on Doppler-types is a Leeds & Northrup instrument whose specifications indicate an accuracy of ±2.6 to ±5%.

The reason for the relative inaccuracy of the Doppler-type ultrasonic flowmeter has not heretofore been understood. The Morris article attributes this deficiency to the inherent inability of the meter to determine the location of the contaminants in the fluid system, but this is not the crux of the problem.

In a Doppler-type flowmeter, reflection from the contaminants in the fluid conducted by the pipe occurs in a zone in which the diverging beam projected by the transmitting transducer intersects the reception beam converging toward the receiving transducer. If within this zone of intersection, the contaminants carried by the fluid were all travelling at the same velocity, then the resultant negative beat between the transmitted and received signal would be a single frequency accurately indicative of flow rate of the fluid. But, in reality, the contaminants in the stream do not usually move at the same velocity, which is why in existing Doppler-type flowmeters, the readout is somewhat misleading.

The velocity of the contaminants depends on the flow profile of the stream, which in turn depends on whether the flow is laminar or turbulent, and on the Reynolds number, so that in many instances the contaminants within the zone of intersection in which reflections are obtained are moving at disparate velocities to produce not a single beat frequency, but a band of beat frequencies. Hence a Doppler-type ultrasonic flowmeter which operates on the assumption that only a single beat frequency is produced, will inevitably be inaccurate.

Velocity profile is the representation of the fluid velocity distribution in a plane perpendicular to the flow direction. Thus an axisymmetrical velocity profile is one in which the velocity is constant at any given radius measured in a direction perpendicular to the flow axis from the center of the flow pipe. Velocity profile is a function of the viscosity of the fluid as well as of the shape of the meter pipe and the presence of disturbances in the pipe line, such as protrusions, elbows, reducers or other discontinuities.

A Doppler-type ultrasonic flowmeter which fails to take velocity profile into account will inherently be inaccurate; for the contaminants in the flow stream do not all move at the same velocity, and unless the velocity profile is determined from which the mean velocity can be calculated, an acceptably accurate reading is not possible.

SUMMARY OF INVENTION

In view of the foregoing, the main object of this invention is to provide a Doppler-type ultrasonic flowmeter which is corrected for errors resulting from changes in flow velocity profile to afford more accurate flow rate readings than are obtainable with standard meters of this type.

More particularly, an object of this invention is to provide a Doppler-type ultrasonic flowmeter which includes means effecting a spectral analysis of the band of beat frequencies produced by the reflecting contaminants carried by the fluid flowing through the meter pipe to determine their velocities.

Yet another object of this invention is to provide a more accurate Doppler-effect ultrasonic flowmeter which functions reliably and efficiently, and which can be manufactured at relatively low cost.

Briefly stated, these objects are attained in a Doppler-type ultrasonic flowmeter in which the pipe is provided with a transmitting transducer energized by a stable oscillator generating a predetermined ultrasonic frequency and a receiving transducer adapted to detect reflections from contaminants carried by the fluid being metered which lie within the zone of intersection between the diverging beam projected by the transmitting transducer and the reception beam converging toward the receiving transducer. The transmitted signal is mixed with the received signal to produce negative and positive beats which are passed through a low-pass filter to extract the band of negative beat frequencies which represent the disparate flow velocities of the contaminants within the zone dictated by the prevailing velocity profile of the fluid being metered.

The band of negative beat frequencies is then subjected to spectral analysis to determine the velocities of the contaminants present in the zone and their relative percentages, from which the approximate flow profile of the fluid is calculated to ascertain the mean flow velocity of the fluid being metered.

OUTLINE OF DRAWINGS

For a better understanding of the invention as well as other objects and further features thereof, reference is made to the following detailed description to be read in conjunction with the accompanying drawings, wherein:

FIG. 1 schematically shows the relationship existing between a typical fluid velocity profile and the zone of intersection between the projected and reception beams in a Doppler-type ultrasonic flowmeter;

FIG. 2 schematically shows this relationship with respect to another fluid velocity profile;

FIG. 3 schematically indicates several possible velocity profiles within the zone of interaction of the beams;

FIG. 4 is a block diagram of a Doppler-type ultrasonic flowmeter in accordance with the invention;

FIG. 5 illustrates the spectral analysis of the output of the flowmeter receiver for the velocity profile shown in FIG. 1;

FIG. 6 illustrates the spectral analysis for the velocity profile shown in FIG. 2.

DESCRIPTION OF INVENTION

Figure 7:
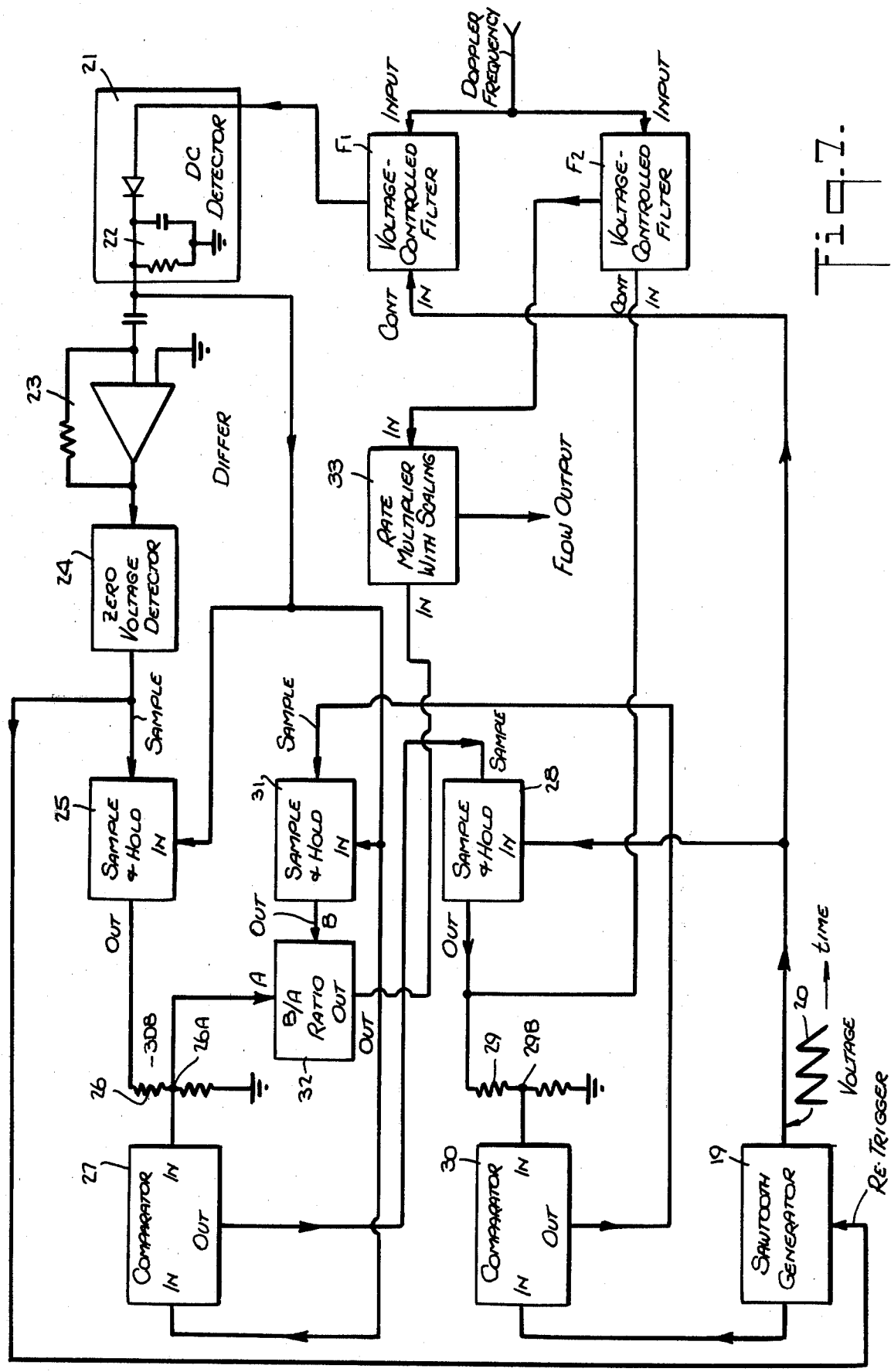
FIG. 7 is a block diagram of the spectral analyzer included in the flowmeter.

The Problem:

In order to demonstrate why conventional Doppler-type ultrasonic flowmeters are incapable of accurately reading the flow rate of a fluid which carries contaminants, such as a slurry or wastewater, we shall, in FIGS. 1 and 2, show the relationship existing between the velocity profile of the fluid passing through a meter pipe 10 and the zone of intersection Z between the projected and reception beams.

In FIGS. 1 and 2, beam $B_t$ represents the diverging beam projection in the upstream direction of ultrasonic energy from a transmitting ultrasonic transducer, while beam $B_r$ represents the converging reception beam in the downstream direction leading toward a receiving transducer, the transmitted ultrasonic energy being reflected in the zone of intersection Z by particles and other contaminants carried in the fluid being metered. The zone of intersection Z is the area in which beam $B_t$ overlies beam $B_r$.

In FIG. 1, the dashed line $P_1$ defines the velocity profile of the liquid being metered, this profile representing the fluid velocity distribution in a plane perpendicular to the flow direction. It will be seen in FIG. 1 that the portion of profile $P_1$ which traverses zone Z is substantially straight; hence the contaminants borne by the fluid which lie within zone Z are all moving at substantially the same velocity.

Profile $P_1$ is likely to be encountered when the flow through the meter pipe is turbulent and the Reynolds number—that is, the index of the ratio of inertia to viscous forces—is high. When, however, the flow is laminar and the Reynolds number is low, then the velocity profile may assume the form $P_2$ as shown in FIG. 2, where it will be seen that the velocity of the stream along the center axis of the pipe is significantly higher than the velocity at the edges of intersection zone. Hence with flow velocity profile $P_2$, the velocities of the contaminants carried by the stream varies in accordance with the distribution curve represented by this profile.

Assuming that the velocity along the center flow axis of the pipe is the same in both FIGS. 1 and 2, it will readily be appreciated that the means velocity of flow in the intersection zone Z in FIG. 2 is quite different from that in FIG. 1.

In FIG. 3, four different velocity profiles $P_1$ to $P_4$ are illustrated as they appear within the confines of zone Z. It will be evident from this figure that the mean flow velocity is different in each case and that a Doppler-type flowmeter that is incapable of determining the mean flow velocity of the fluid being metered would be grossly inaccurate.

The Flowmeter:

Referring now to FIG. 4, there is shown a Doppler-type ultrasonic flowmeter in accordance with the invention, the meter including a transmitting transducer 11 and a receiving transducer 12 mounted on the exterior of meter pipe 10. The transducers may be in a clamp-on arrangement of the type commonly used in commercially available flowmeters, so that it may be installed in an existing pipe in the manner illustrated in the above-identified Morris article.

Transmitting transducer 11, which in practice may be a crystal element, is excited by a stable oscillator 13 generating a high ultrasonic frequency FT, such as 625 kHz. The receiver transducer 12 picks up a reflected signal FR whose frequency shift relative to FT depends on the velocities of the reflecting contaminants borne by the fluid being metered.

The signal yielded by receiving transducer 12 is amplified by amplifier 14 and fed to one input of a mixer 15 to whose other input is applied the transmitted signal from oscillator 13. The output of the mixer is both the positive beat FT+FR and the negative beat FT−FR. The mixer output is fed through a low-pass filter 16 which discriminates against the positive beat, thereby yielding only FT−FR. In a standard Doppler-type flowmeter, the flow rate reading is derived directly from this negative beat.

As pointed out previously, the negative beat is a single frequency only when the flow velocity profile is such that all contaminants within the intersection zone of the projected and reception beams move at the same velocity. But since this condition rarely occurs, the output of filter 15 is not a single negative beat frequency but is a band of discrete negative beat frequencies that represents the disparate fluid velocities in the intersection zone.

The band of negative beat frequencies is applied to a spectral analyzer 17 which acts to identify the beat frequencies and hence the flow velocities which are present in the intersection zone, as dictated by the prevailing flow velocity profile. By making a spectral analysis of this band, it can be determined which velocities are present and their relative percentages. From this analysis one can in stage 18 calculate the approximate flow profile, from which profile one can derive the mean velocity of flow to provide a readout which represents a significant improvement in accuracy over standard Doppler-type meters.

Spectral Analysis:

The spectral analysis illustrated in FIG. 5 is that of the negative beat Doppler signal when the flowmeter operates with a turbulent flow, high Reynolds number, to produce the flow velocity profile shown in FIG. 1. The spectral analysis illustrated in FIG. 6 is that of the Doppler signal when the flowmeter operates with laminar flow, low Reynolds number, to produce the velocity profile shown in FIG. 2. The actual spectral analysis in each meter installation will be affected by many variables, this being especially true of the spectra labelled in FIGS. 5 and 6 as noise.

It is important to recognize that while frequency and amplitude are shown as dimensionless numbers, they are really variables. For a given flowmeter and a given fluid, the amplitude will be relatively constant. The Doppler shift frequency plotted in FIGS. 5 and 6 is the difference between the projected and reception frequencies and is a direct function of flow velocity; hence it changes with the flow velocity profile. If the fluid in the meter changes or is changed so that the penetration of the ultrasonic beam is altered and there are changes in reflection, the amplitude can change by several orders of magnitude. The dimensionless shape of the curves in FIGS. 5 and 6, however, remain essentially fixed.

The plot of spectral amplitude versus frequency is generated by sweeping the frequency range with a band pass filter and measuring the amplitude of the output of each frequency in the range.

If we define the maximum fluid velocity in the flow profile at a given flow rate as the −3 DB point on the amplitude curve (Point A) and a point at, say, 90% of that velocity (or any other percentage below 100%) as point B, then the ratio of "B" divided by "A" is an index to the flow profile. In FIG. 5, which illustrates the spectral analysis for a turbulent flow velocity profile as shown in FIG. 1, "B" is larger than in FIG. 6, which is the spectral analysis for laminar flow as shown in FIG. 2, thereby indicating a larger percentage of high velocity fluid in the flowstream.

In practice, the Doppler frequency representing point "A" can be measured by using a filter removing some of the unwanted lower frequencies. If the Doppler frequency at point "A"0 is multiplied by a scaled ratio of "B" divided by "A," a fluid velocity taking into account the flow profile, is obtained. In determining this flow velocity profile, one can use more than two points "A" and "B."

Spectral Analyzer:

Referring now to FIG. 7, there is illustrated an analog-type of spectral analyzer for use in an ultrasonic flowmeter in accordance with the invention. In practice, one may perform the identical functions in a digital spectral analyzer making use of a microprocessor.

In FIG. 7, the Doppler signal, which is the negative beat of the transmitted and the received frequencies, is applied to a voltage-controlled band pass filter $F_1$ whose operation is controlled by a sawtooth generator 19. When the voltage of the sawtooth, as indicated by waveform 20, is at its maximum level, band pass filter $F_1$ controlled thereby is centered on a peak frequency which lies above the maximum Doppler frequency encountered at maximum flow in the flowmeter. And as the sawtooth voltage thereafter declines from its maximum level, filter $F_1$ sweeps below the peak frequency through the lower frequencies in the range.

The output of band pass filter $F_1$ is applied to a DC detector 21 constituted by a rectifier and filter network 22 to produce a varying D-C output which assumes a formation similar to the curves in FIGS. 5 and 6. The varying D-C output of D-C detector 21 is applied to a differentiating circuit 23. When the differential $(dy/dx)=0$, a maximum or minimum will then exist. Because of the shape of the curves and the fact that the filter is sweeping down, at zero a maximum exists.

Zero-voltage detector 24 coupled to the output of differential circuit 23 detects the zero condition and therefore senses when the maximum voltage is reached on the D-C curve. When voltage detector 24 senses the maximum level, its output is used in the associated sample and hold circuit 25 to initiate a sampling cycle so that the output of circuit 25 will become equal to its input and will remain so until the next sample period. The output D-C detector 21 is also applied to the input of sample and hold circuit 25.

Since there is no interest in any information to the left of the maximum amplitude of the curves in FIGS. 5 and 6, the output of zero voltage detector 24 is also applied to the re-trigger input of sawtooth generator 19 to cause it to restart from its maximum voltage level.

The output of sample and hold circuit 25 is applied to a voltage divider 26 to establish at its junction 26A the −3 DB point "A." A comparator 27 has one of its inputs connected to junction 28A and the other connected to the output of DC detector 21. Comparator 27 yields a momentary output in the following cycle when the output of DC detector 21 equals the −3 DB point set up by divider 26. This momentary output is applied as a sample to the second sample and hold circuit 28 which receives its input from sawtooth generator 19. When it samples, the voltage at the output of circuit 28 becomes a sawtooth voltage, provided that the voltage from DC detector 21 is at the −3 DB point.

A voltage divider 29 divides the voltage yielded in the output of sample and hold circuit 28 and holds this to a 90% value at junction 29B. Since voltage-controlled filter $F_1$ scans linearly with voltage, this acts to put the center frequency of filter $F_1$ at the 90% point "B" when the sawtooth voltage is equal to this value.

A comparator 30 has one of its inputs connected to sawtooth generator 19 and its other connected to divider junction 29B to compare the sawtooth voltage with the 90% voltage of the divider. When the compared voltages attain equality, a sample pulse is yielded by comparator 30 which is applied to a third sample and hold circuit 31. Sample and hold circuit 31 takes its input from the output of DC detector 21; and when it receives a sample at the 90% frequency point, its output acts to hold the amplitude of D-C detector 21 at point "B."

A ratio circuit 32 is coupled to divider junction 26A yielding voltage "A," and to the output of sample and hold circuit 31, which holds voltage "B," divides voltage B by voltage A. The B/A output of ratio circuit 32 therefore represents the flow profile shape, this being used to calculate the average flow velocity.

The Doppler signal representing the difference between the transmitted and received frequencies is also applied to a second voltage-controlled filter $F_2$, which is positioned at the $-3$ DB point by the output of the sample and hold circuit 28. By removing broad band frequency noise, filter $F_2$ aids measurably in the recovery of an accurate frequency. This frequency is applied to one input of a scaled rate multiplier 33 whose other input is connected to the output of the B/A ratio circuit 32. Multiplier 33 acts to multiply the frequency from filter $F_2$ with the B/A, and when properly scaled, this yields the average pipe flow velocity.

While there has been shown and described a preferred embodiment of a Doppler-type ultrasonic flowmeter in accordance with the invention, it will be appreciated that many changes and modifications may be made therein without, however, departing from the essential spirit thereof. Thus the meter is bi-directional, and if the flow in the pipe reversed direction, the Doppler shift will likewise change direction.

I claim:

1. A Doppler-type ultrasonic flowmeter for measuring the mean flow velocity of a fluid stream carrying contaminants passing through a pipe, said stream having a changing velocity profile, said flowmeter comprising:

A a transmitting transducer mounted on the pipe to project in the upstream direction therein a diverging beam of ultrasonic energy;

B a stable oscillator coupled to the transmitting transducer to excite same at a predetermined ultrasonic frequency;

C a receiving transducer mounted on the pipe to pick up ultrasonic energy reflected by moving contaminants in the fluid which lie within the zone in which the projected beam intersects a converging reception beam leading downstream to the receiving transducer to produce a Doppler signal;

D means responsive to the transmitted frequency and the Doppler signal to produce a band of negative beat frequencies which are determined by the disparate flow velocities of the reflecting contaminants dictated by the prevailing velocity profile; and E means responsive to the band of negative beat frequencies to determine the prevailing velocity profile and to derive therefrom the mean flow velocity, said means including spectral analyzer which sweeps through a frequency range that includes said band, the analyzer functioning to measure the amplitude output of each frequency in the band to provide a spectral analysis.

2. A flowmeter as set forth in claim 1, wherein said means producing the band of negative beat frequencies are constituted by a mixer coupled to the receiving transducer and the oscillator to produce a negative and positive beat output and a low-pass filter to segregate the negative beat therefrom.

3. A flowmeter as set forth in claim 2, wherein said spectral analyzer is coupled to the output of the low-pass filter.

4. A flowmeter as set forth in claim 3, wherein the spectral analyzer includes a voltage-controlled filter which sweeps through a frequency range that includes said band.

5. A flowmeter as set forth in claim 4, wherein said velocity profile is determined by dividing the voltage existing in the amplitude curve at a first frequency point with that existing at a second point which is a predetermined percentage of the first point.

6. A flowmeter as set forth in claim 5, wherein said predetermined percentage is 90%.

7. A flowmeter as set forth in claim 4, wherein said spectral analyzer includes a D-C detector coupled to the output of the voltage-controlled filter.

* * * * *